US012780084B2

(12) United States Patent
Ueda

(10) Patent No.: US 12,780,084 B2
(45) Date of Patent: Nov. 3, 2026

(54) POOR VISIBILITY DETERMINATION DEVICE

(71) Applicant: TOYOTA JIDOSHA KABUSHIKI KAISHA, Toyota (JP)

(72) Inventor: Kazuhiko Ueda, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 19/032,525

(22) Filed: Jan. 21, 2025

(65) Prior Publication Data

US 2025/0242746 A1 Jul. 31, 2025

(30) Foreign Application Priority Data

Jan. 26, 2024 (JP) ................................ 2024-010182

(51) Int. Cl.

| | |
|---|---|
| ***G08G 1/16*** | (2006.01) |
| ***B60Q 1/14*** | (2006.01) |
| ***B60S 1/08*** | (2006.01) |
| ***B60W 10/30*** | (2006.01) |
| ***B60W 60/00*** | (2020.01) |
| ***G06V 20/56*** | (2022.01) |
| ***G08G 5/80*** | (2025.01) |
| ***G08G 7/02*** | (2006.01) |

(52) U.S. Cl.

CPC ............ *B60Q 1/143* (2013.01); *B60S 1/0896* (2013.01); *B60W 10/30* (2013.01); *B60W 60/0053* (2020.02); *G06V 20/56* (2022.01); *B60W 2420/403* (2013.01); *B60W 2555/20* (2020.02)

(58) Field of Classification Search

CPC ...... B60Q 1/143; B60S 1/0896; B60S 1/0844; B60W 10/30; B60W 60/0053; B60W 2420/403; B60W 2555/20; G06V 20/56

See application file for complete search history.

(56) References Cited

U.S. PATENT DOCUMENTS

| | | | | |
|---|---|---|---|---|
| 2008/0007429 | A1 | 1/2008 | Kawasaki et al. | |
| 2016/0328980 | A1 * | 11/2016 | Sharma .................... | G08G 5/26 |

(Continued)

FOREIGN PATENT DOCUMENTS

| | | | | |
|---|---|---|---|---|
| JP | 2008-033872 | A | | 2/2008 |
| JP | 2020086815 | A | * | 6/2020 |

(Continued)

OTHER PUBLICATIONS

JP-2021034852-A machine translation (Year: 2021).*
JP-2020086815-A machine translation (Year: 2020).*

*Primary Examiner* — Anne Marie Antonucci
*Assistant Examiner* — Jingli Wang
(74) *Attorney, Agent, or Firm* — Dinsmore & Shohl LLP

(57) ABSTRACT

The poor visibility determination device includes a processor configured to determine whether or not a field of view in an imaging area of a camera that is mounted on a vehicle and captures surroundings of the vehicle is in a poor visibility state based on a plurality of images generated within a predetermined determination period by the camera, and set the determination period so that a length of the determination period when at least one visibility ensuring device for ensuring visibility of the field of view of the camera is operating is shorter than the length of the determination period when the visibility ensuring device is not operating.

5 Claims, 5 Drawing Sheets

(56) References Cited

U.S. PATENT DOCUMENTS

| | | | | |
|---|---|---|---|---|
| 2017/0351254 | A1* | 12/2017 | Listwin | G05D 1/0022 |
| 2021/0009165 | A1* | 1/2021 | Sugimoto | B60Q 1/143 |
| 2023/0143999 | A1 | 5/2023 | Takashima | |

FOREIGN PATENT DOCUMENTS

| | | | | |
|---|---|---|---|---|
| JP | 2021-014183 | A | | 2/2021 |
| JP | 2021034852 | A | * | 3/2021 |
| JP | 2023-071272 | A | | 5/2023 |

* cited by examiner

FIG. 4

400

| HEADLIGHT ON/OFF | LIGHTING DIRECTION | WIPER OPERATION MODE | | | |
|---|---|---|---|---|---|
| | | OFF | INT | LO | HI |
| OFF | Lo | 180 SEC | 80 SEC | 40 SEC | 20 SEC |
| | Hi | | | | |
| ON | Lo | | 40 SEC | 20 SEC | 10 SEC |
| | Hi | | 20 SEC | 10 SEC | 5 SEC |

POOR VISIBILITY DETERMINATION DEVICE

CROSS-REFERENCE TO RELATED APPLICATIONS

This application claims priority to Japanese Patent Application No. 2024-010182 filed Jan. 26, 2024, the entire contents of which are herein incorporated by reference.

FIELD

The present disclosure relates to a poor visibility determination device that determines a state of a visual field in a capturing range of a camera mounted on a vehicle.

BACKGROUND

A technique for determining whether or not the visibility of a driver of a vehicle is in a poor visibility state has been proposed (see Japanese Unexamined Patent Publication JP2020-86815A).

SUMMARY

In order to control autonomous driving of a vehicle or to assist driving of a driver of a vehicle, an image representing the surroundings of the vehicle generated by a camera mounted on the vehicle may be used. However, if the field of view of the camera becomes poor for some reason, the situation around the vehicle is not represented in the image, and as a result, it becomes difficult to normally execute autonomous driving control or driving assist. Therefore, it is desired to be able to determine whether or not the field of view of the camera is poor as quickly as possible.

It is an object of the present disclosure to provide a poor visibility determination device capable of reducing a time required for determining whether or not a visual field of a camera mounted on a vehicle is in a poor visibility state.

According to one embodiment, a poor visibility determination device is provided. The poor visibility determination device includes a processor configured to: determine whether or not ta field of view in an imaging area of a camera mounted on a vehicle and capturing surroundings of the vehicle is in a poor visibility state based on a plurality of images generated within a predetermined determination period by the camera, and set the determination period so that a length of the determination period when at least one visibility ensuring device for ensuring visibility of a field of view of the camera is operating is shorter than the length of the determination period when the visibility ensuring device is not operating.

In one embodiment, the visibility ensuring device includes a wiper, and the processor shortens the length of the determination period as the operation period of the wiper is shorter.

In one embodiment, the visibility ensuring device includes a headlight, and the processor sets the determination period so that the length of the determination period when the headlight is turned on and a lighting direction of the headlight is high is shorter than the length of the determination period when the lighting direction is low.

In one embodiment, the visibility ensuring device includes a wiper and a headlight, and the processor sets the determination period so that the length of the determination period when the headlight is turned on and the wiper is operating is shorter than the length of the determination period when the headlight is turned off or the wiper is not operating.

In one embodiment, the visibility ensuring device includes a headlight, and when the headlight is turned on, the processor determines whether or not the field of view in the imaging area of the camera is in the poor visibility state based on the value of each pixel included in an area corresponding to an illumination range of the headlight in each of the plurality of images generated within the determination period.

The poor visibility determination device according to the present disclosure has an advantageous effect of being able to reduce a time required for determining whether or not a visual field of a camera mounted on a vehicle is in a poor visibility state.

BRIEF DESCRIPTION OF DRAWINGS

FIG. 4 is a diagram illustrating an example of a table indicating a relationship between an operation mode of a headlight and a wiper and a length of a determination period of poor visibility.

DESCRIPTION OF EMBODIMENTS

Hereinafter, a poor visibility determination device, a poor visibility determination method, and a poor visibility determination computer program executed by the poor visibility determination device will be described with reference to the drawings. The poor visibility determination device determines whether or not the visual field in the imaging area of the camera mounted on a vehicle and capturing an image of the surroundings of the vehicle is in a poor visibility state based on a plurality of images generated by the camera within a predetermined determination period. At this time, the poor visibility determination device adjusts the length of the determination period in accordance with the operation status of at least one visibility ensuring device for ensuring visibility of the field of view of the camera. In the following description, the field of view in the imaging area of the camera may be simply referred to as the field of view of the camera.

Figure 1:
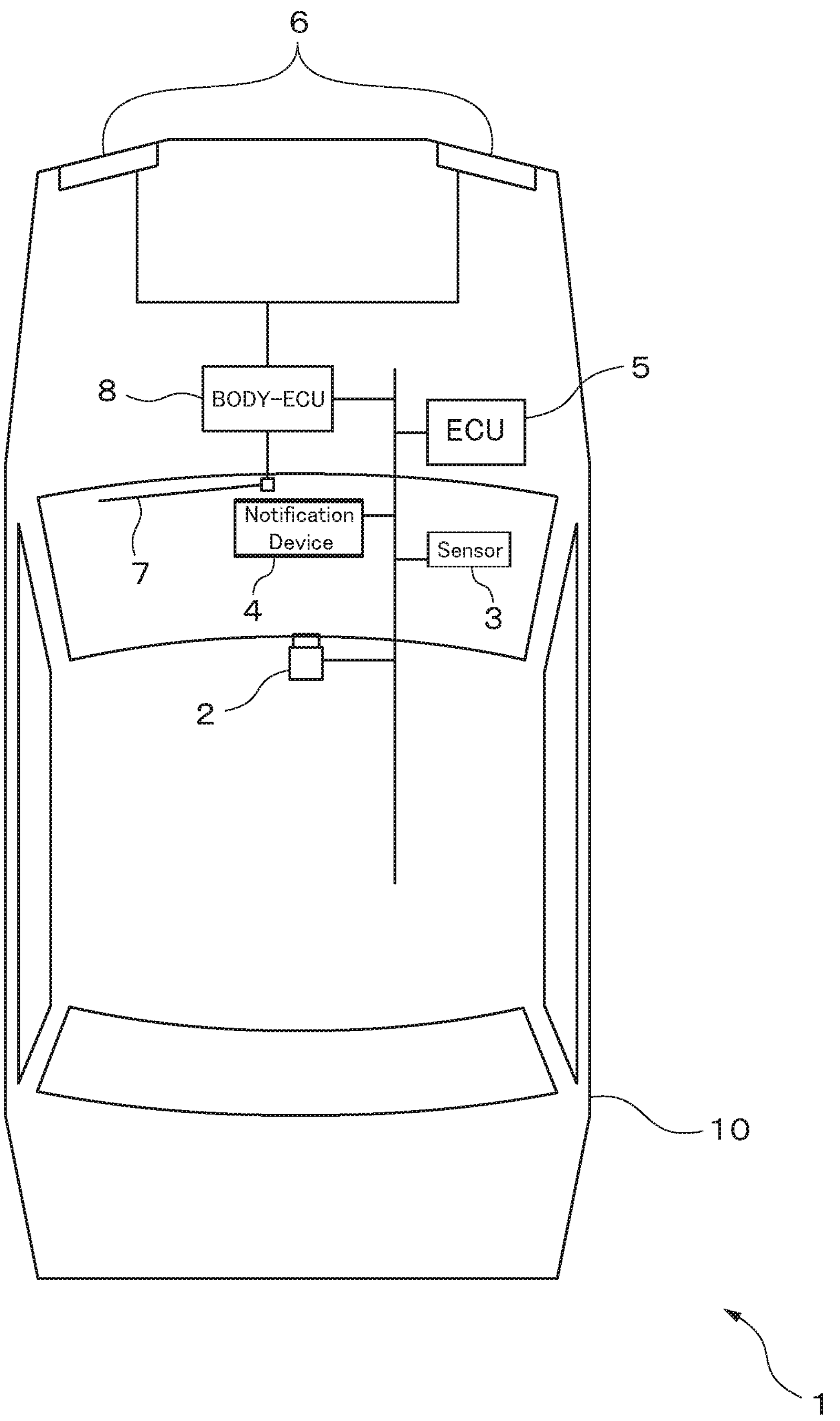
FIG. 1 schematically illustrates the configuration of a vehicle control system including a poor visibility determination device.

FIG. 1 schematically illustrates the configuration of a vehicle control system including a poor visibility determination device. The vehicle control system 1 mounted on the vehicle 10 includes a camera 2, a rainfall sensor 3, a notification device 4, and an electronic control unit (ECU) 5 that is an example of the poor visibility determination device. The camera 2, the rainfall sensor 3 and the notification device 4 are communicably connected to the ECU 5 via an in-vehicle network. Furthermore, the ECU 5 is connected to an electronic control unit (BODY-ECU) 8 for controlling a headlight 6 and a wiper 7 via an in-vehicle network. Each of the headlight 6 and the wiper 7 is an example of a visibility ensuring device for ensuring the visibility of the field of view of the camera 2.

The camera 2 is mounted in the interior of the vehicle 10 so as to capture a predetermined imaging area around the vehicle 10. Then, the camera 2 captures the predetermined imaging area every predetermined capturing cycle (for example, 1/30 second to 1/10 second), and generates an image in which the imaging area is represented. In the present embodiment, the imaging area is a region in front of the vehicle 10, and the camera 2 is mounted in the vehicle interior so as to be oriented in the front direction of the vehicle 10. Therefore, when the windshield is fogging up, the view in the imaging area of the camera 2 is blocked by the cloudiness, so that the visibility of the camera 2 is in a poor visibility state. Further, when dirt adheres to the windshield at a position corresponding to the front surface of the camera 2, a part or all of the field of view in the imaging area of the camera 2 is blocked by the dirt, and the visibility in the imaging area of the camera 2 becomes the poor visibility state. Note that the vehicle 10 may be provided with two or more cameras having different imaging areas.

Each time an image is generated, the camera 2 outputs the generated image to the ECU 5 via the in-vehicle network.

The rainfall sensor 3 is provided on, for example, the windshield of the vehicle 10, and measures the rainfall around the vehicle 10. Then, the rainfall sensor 3 outputs a rainfall signal representing the measured rainfall to the ECU 5 via the in-vehicle network at predetermined intervals.

Note that the rainfall sensor 3 may be provided so as to be connected to the BODY-ECU 8. In this case, the ECU 5 may acquire the rainfall signal via the BODY-ECU 8.

The notification device 4 is provided in the interior of vehicle 10 and is a device that gives a predetermined notification to the driver by light, sound, character display, or image display. For this purpose, the notification device 4 includes, for example, at least one of a speaker, a light source, and a display device. When the notification device 4 receives a notification signal indicating a predetermined notification item from the ECU 5 to the driver, the notification item is notified to the driver by the sound from the speaker, the emission or the blinking of the light source, or the display of a message or an icon by the display device.

The ECU 5 can autonomously drive the vehicle 10 based on images generated by the camera 2, or can support driving of a driver of the vehicle 10. However, when the visibility of the camera 2 is in a poor visibility state, it is difficult to execute the autonomous driving control and the driving assist. Therefore, the ECU 5 analyzes the images generated by the camera 2 to determine whether or not the visibility of the camera 2 is in the poor visibility state.

Figure 2:
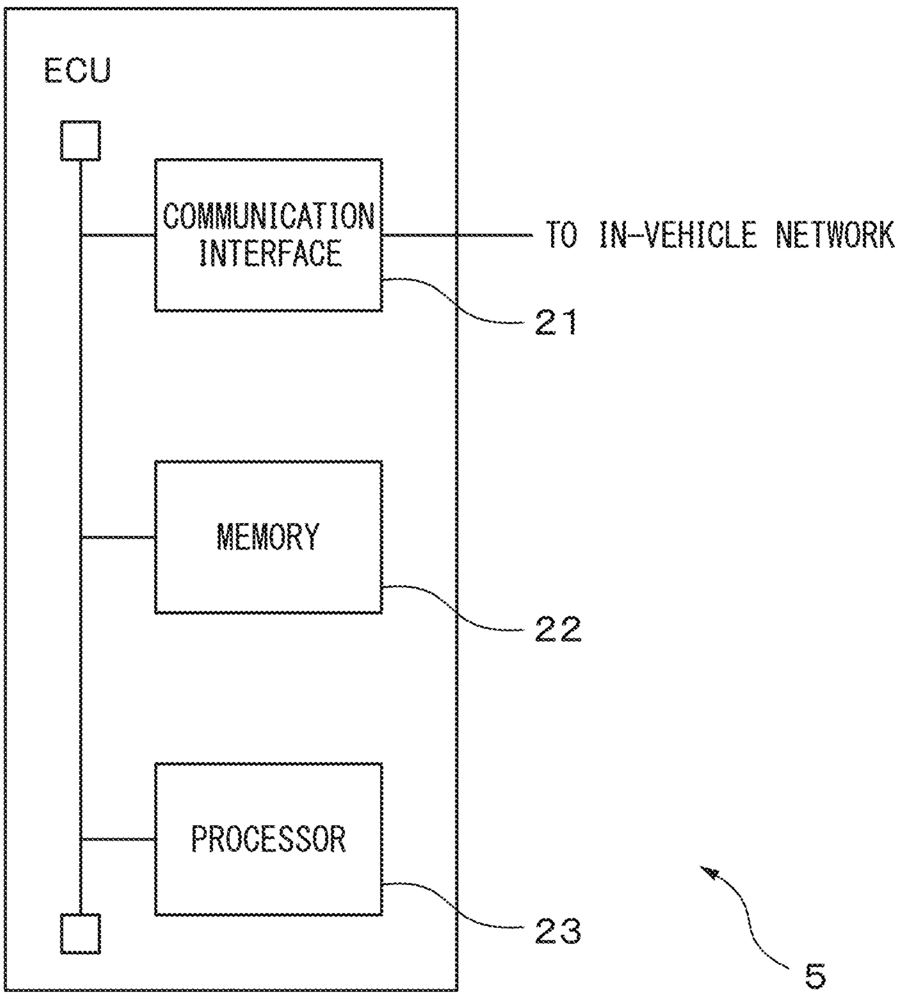
FIG. 2 illustrates the hardware configuration of an electronic control unit, which is an example of the poor visibility determination device.

FIG. 2 illustrates the hardware configuration of the ECU 5. As shown in FIG. 2, the ECU 5 includes a communication interface 21, a memory 22, and a processor 23. The communication interface 21, the memory 22, and the processor 23 may each be configured as separate circuits or may be integrally configured as a single integrated circuit.

The communication interface 21 includes an interface circuit for connecting the ECU 5 to the in-vehicle network. The communication interface 21 passes the image received from the camera 2 to the processor 23. Similarly, the communication interface 21 passes the rainfall signal received from the rainfall sensor 3 to the processor 23. When the communication interface 21 receives a signal representing the operation mode of the headlight 6 or a signal representing the operation mode of the wiper 7 from the BODY-ECU 8, the communication interface 21 passes the signal to the processor 23. Further, the communication interface 21 outputs a notification signal to the driver received from the processor 23 to the notification device 4.

The memory 22 is an example of a storage unit, and includes, for example, a volatile semiconductor memory and a non-volatile semiconductor memory. The memory 22 stores various programs and various types of data used in the poor visibility determination process executed by the processor 23 of the ECU 5. For example, the memory 22 stores various parameters used for determining a poor visibility in the field of view of the camera 2, a message to be notified to the driver, and the like. In addition, the memory 22 stores images received in a latest certain period, a rainfall signal, an operation mode being applied to the headlight 6, and an operation mode being applied to the wiper 7. Further, the memory 22 temporarily stores various types of data generated during executing the poor visibility determination process. Furthermore, the memory 22 stores various types of data used for autonomous driving control or driving assist of the vehicle 10.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a poor visibility determination process.

Figure 3:
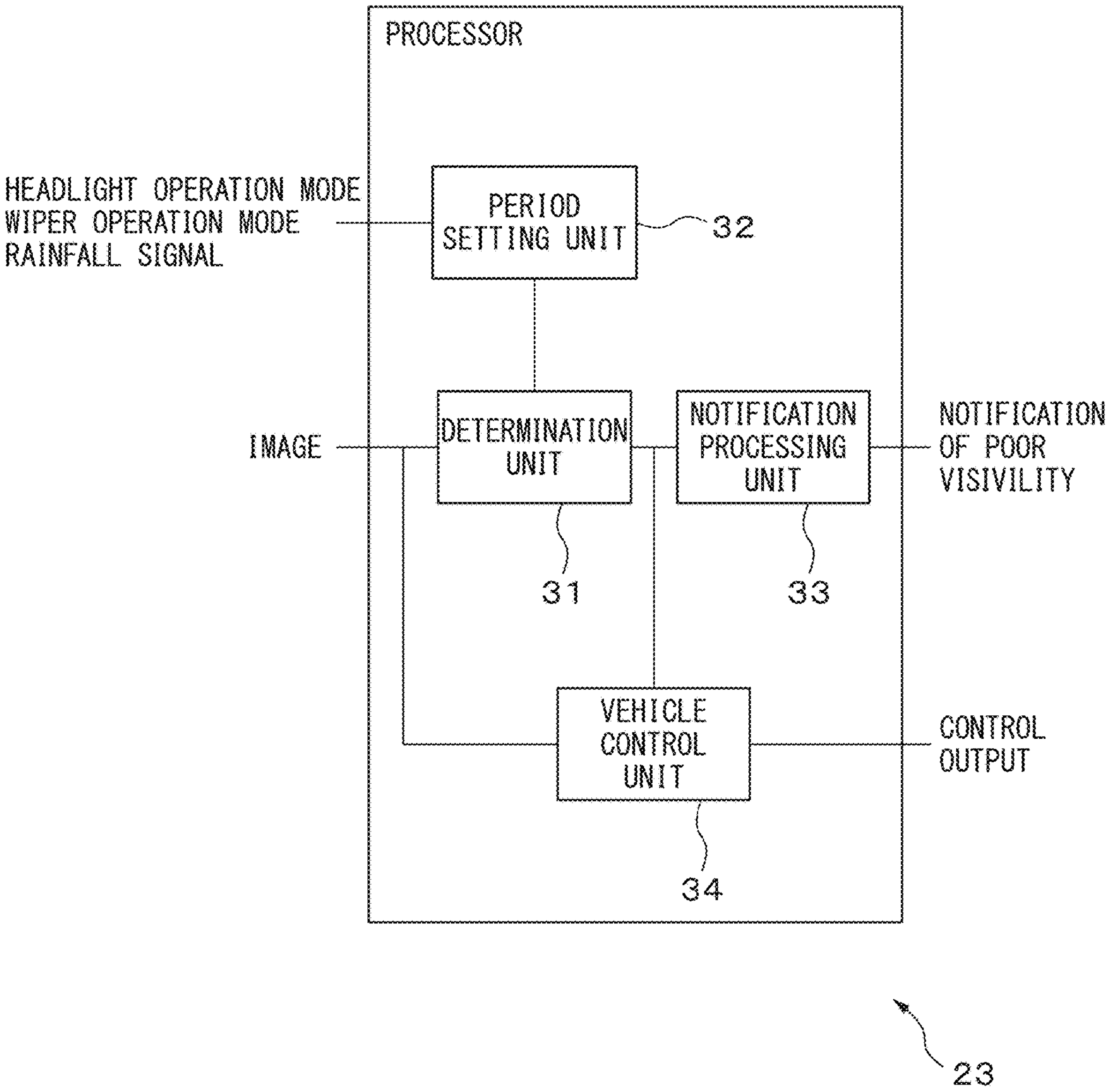
FIG. 3 is a functional diagram of a processor of ECU related to a vehicle control process including a poor visibility determination process.

FIG. 3 is a functional block diagram of the processor 23 relating to a vehicle control process including a poor visibility determination process. The processor 23 includes a determination unit 31, a period setting unit 32, a notification processing unit 33, and a vehicle control unit 34. Each of these units included in the processor 23 is a functional module, for example, implemented by a computer program executed by the processor 23. Alternatively, these units may be dedicated operating circuits provided separately from each other in the processor 23. Among these units, the determination unit 31 and the period setting unit 32 are particularly related to the poor visibility determination process.

The determination unit 31 determines whether or not the field of view of the camera 2 is in a poor visibility state. In the present embodiment, the poor visibility state of the field of view of the camera 2 refers to a state in which the situation around the vehicle 10 represented in an image generated by the camera 2 is so unclear that it becomes difficult to execute the automatic driving control or the driving assist of the vehicle 10. As described above with respect to the camera 2, the poor visibility state of the field of view of the camera 2 is caused by, for example, fogging of the glass (in the present embodiment, the windshield) of the interior located on the front surface of the camera 2, adhesion of dirt to the glass, or damage to the glass.

The determination unit 31 determines whether or not the field of view of the camera 2 is in the poor visibility state based on a plurality of images generated by the camera 2 within the determination period. As will be described in detail later, the length of the determination period is set by the period setting unit 32.

When the glass located on the front surface of the camera 2 fogs up, the contrast of the image generated by the camera 2 is reduced because the difference between light and dark is difficult to distinguish. Also, the strengths of the edges on the image are reduced because the road markings or objects on the road surface around the vehicle 10 represented in the image will appear blurry. Therefore, the determination unit 31 calculates, for each image, the edge strength of each pixel by executing an edge detection filter process such as a Sobel filter or a Laplacian filter on each pixel in a predetermined area on the image. Then, the determination unit 31 calculates, for each image, a statistical representative value of the edge strength calculated for each pixel. The statistical representative value of the edge strength can be, for example, the average value or the median value of the edge strength, or the upper quartile in the distribution of the edge strength. The determination unit 31 determines that the field of view of the camera 2 is in the poor visibility state when the state in which the statistical representative value of the edge strength is equal to or less than the fogging determination threshold value continues over the determination period. Alternatively, the determination unit 31 may determine that the field of view of the camera 2 is in the poor visibility state when the ratio of the number of images in which the statistical representative value of the edge intensity is equal to or less than the fogging determination threshold value to the total number of images obtained during the determination period is equal to or greater than a predetermined ratio (for example, 0.8 to 0.9).

Alternatively, the determination unit 31 may calculate, for each image, a distribution of the luminance of each pixel in the predetermined area of the image, and calculate, for each image, the difference between the luminance of the upper predetermined ratio (for example, the upper 5%) and the luminance of the lower predetermined ratio (for example, the lower 5%) in the luminance distribution based on the luminance distribution as the contrast. Then, the determination unit 31 may determine that the field of view of the camera 2 is in the poor visibility state when the state in which the contrast is equal to or less than the predetermined fogging determination threshold continues for the determination period.

In addition, if the glass located on the front surface of the camera 2 is stained or damaged, a part or the entire of the field of view of the camera 2 is blocked by the stain or the scratch. As a result, a region having no movement and no luminance change appears in a plurality of images obtained in time series. Therefore, the determination unit 31 divides, for each of the plurality of images obtained in time series, the image into a plurality of blocks, and executes block matching between the previous and subsequent images in time series for each block. Then, the determination unit 31 detects, as a block having no motion change, a block in which a change in the positions of the blocks closest to each other between the previous and subsequent images is equal to or smaller than a predetermined motion determination threshold value (for example, one pixel). Furthermore, the determination unit 31 calculates the absolute value sum of the luminance differences between the corresponding pixels between the previous and subsequent images for each block having no motion change. Then, the determination unit 31 detects, as a block having no time-series change, a block in which the sum of the absolute values of the luminance difference is equal to or less than the luminance change threshold (for example, 5 to 10) among the blocks having no motion change between the previous and subsequent images. The determination unit 31 determines that the field of view of the camera 2 is in the poor visibility state when the state in which the block having no time-series change at the same position is detected continues for the determination period.

Note that the predetermined area may be a fixed area stored in advance in the memory 22, and may be, for example, an entire image or an area in which a road surface is assumed to be represented on an image. Alternatively, the predetermined area may be set as a different region depending on the operation mode of the headlight 6. When the headlight 6 is on, the predetermined area may be an area on the image corresponding to the illumination range of the headlight 6. Therefore, the predetermined area in the case where the lighting direction of the headlight 6 is high is set to be wider than the predetermined area in the case where the lighting direction of the headlight 6 is low. On the other hand, when the headlight 6 is off, the predetermined area can be an area in which a road surface is assumed to be represented on an image. In this case, the determination unit 31 may determine the predetermined area for obtaining the statistical representative value of the edge strength by referring to the latest signal representing the operation mode of the headlight 6 received from the BODY-ECU 8 and the information representing the predetermined area corresponding to the operation mode of the headlight 6, which is stored in advance in the memory 22.

Furthermore, in some embodiments, in the case where the wiper 7 is operating, the image generated immediately after the wiper blade wipes the position of the front surface of the camera 2 may be used for the determination of the poor visibility. This is because, immediately after the wiper blade has been wiped, there is a high possibility that the water droplets on the glass on the front surface of the camera 2 are removed, and the influence of the water droplets adhering on the glass on the field of view of the camera 2 is minimized. Therefore, each time a signal indicating that the wiper blade is at the reference position is received from the BODY-ECU 8, the determination unit 31 specifies an image generated by the camera 2 immediately after the elapse of a required time corresponding to the operation mode of the wiper 7 from the reception of the signal until the wiper blade passes through the position of the front surface of the camera 2 from the reference position. Then, the determination unit 31 may use the identified image for the above-described processing of determining the poor visibility. The time required for the wiper blade to pass from the reference position to the position on the front surface of the camera 2 is stored in advance in the memory 22 for each operation mode of the wiper 7.

The determination unit 31 notifies the notification processing unit 33 and the vehicle control unit 34 of the determination result as to whether or not the field of view of the camera 2 is in the poor visibility state.

The period setting unit 32 sets the length of the determination period used for determining whether or not the field of view of the camera 2 is in the poor visibility state. In the present embodiment, the period setting unit 32 refers to at least one of the operation mode of the headlight 6 and the operation mode of the wiper 7 in order to set the length of the determination period. That is, when the headlight 6 is turned on, the imaging area of the camera 2 is illuminated by the headlight 6, so that the lighting of the headlight 6 is useful for ensuring visibility of the field of view of the camera 2. Similarly, when the wiper 7 is operating, raindrops on the glass located in front of the camera 2 are removed, so that the operation of the wiper 7 is useful for ensuring visibility of the field of view of the camera 2. That is, when the headlight 6 is turned on or the wiper 7 is operating, visibility of the field of view of the camera 2 is basically secured, and therefore, even if the determination period is relatively short, it is possible to appropriately determine whether the field of view of the camera 2 is in the poor visibility state. On the other hand, when the headlight 6 is not lit and the wiper 7 is not operating, even if the field of view of the camera 2 is not in the poor visibility state, the luminance distribution or the contrast of the image temporarily decreases due to the situation around the vehicle 10, or there is a possibility that an area without movement or luminance change on the image temporarily occurs. Therefore, in some embodiments, in order to appropriately determine whether or not the field of view of the camera 2 is in the poor visibility state, the determination period is set to be relatively long.

Therefore, the period setting unit 32 refers to the latest operation mode of the headlight 6 and the latest operation mode of the wiper 7 received from the BODY-ECU 8. Then, the period setting unit 32 sets the determination period such that the determination period when at least one visibility ensuring device is operating is shorter than the determination period when the visibility ensuring device is not operating. That is, the determination period when the headlight 6 is turned on or the wiper 7 is operating is set shorter than the determination period when the headlight 6 is turned off and the wiper 7 is stopped.

Further, the period setting unit 32 may set the determination period when the lighting direction of the headlight 6 is high to be shorter than the determination period when the lighting direction of the headlight 6 is low. This is because when the lighting direction is high, the imaging area of the camera 2, that is, the field of view is brighter than when the lighting direction is low, and thus it is possible to more easily determine the poor visibility.

Furthermore, the period setting unit 32 may set the determination period to be shorter as the operation period of the wiper 7 is shorter. This is because the shorter the operation period of the wiper 7, the higher the possibility that water droplets adhering to the glass are removed from the front surface of the camera 2.

FIG. 4 is a diagram illustrating an example of a table representing the relationship between the operation modes of the headlight 6 and the wiper 7 and the length of the determination period. The table 400 is stored in advance in the memory 22, and the period setting unit 32 may set the length of the determination period according to the operation mode of each of the headlight 6 and the wiper 7 with reference to the table 400.

In the table 400, the length of the determination period is indicated in each column. Each row indicates, in order from the top, the length of the determination period when the headlight 6 is off, the length of the determination period when the headlight 6 is on and the lighting direction is low, and the length of the determination period when the headlight 6 is on and the lighting direction is high. Further, each column indicates, in order from the left, the length of the determination period when the operation of the wiper 7 is stopped, the length of the determination period when the wiper 7 is operating at an intermittent operation (INT), the length of the determination period when the wiper 7 is operating at a relatively low speed (i.e., when the operation period is relatively long), and the length of the determination period when the wiper 7 is operating at a relatively high speed (i.e., when the operation period is relatively short). As shown in the table 400, it can be seen that the determination period becomes shorter as the operation speed of the wiper 7 becomes higher. Further, it can be seen that the determination period when the headlight 6 is turned on is set to a shorter than the determination period when the headlight 6 is turned off. Further, it can be seen that, in the case where the headlight 6 is turned on, the determination period when the lighting direction is high is set to a shorter than the determination period when the lighting direction is low.

Note that, in the table 400, the length of the determination period when the wiper 7 is stopped is set to be a constant length regardless of whether the headlight 6 is turned on or not, and is set to be longer than when the wiper 7 is in operation, but the present disclosure is not limited thereto. Even when the operation of the wiper 7 is stopped, the determination period may be set shorter when the headlight 6 is turned on than when the headlight is turned off. Further, even when the operation of the wiper 7 is stopped, the determination period may be set shorter when the lighting direction is high than when the lighting direction of the headlight 6 is low.

When the rainfall measured by the rainfall sensor 3 is less than the lower limit threshold value for operating the wiper 7, it is estimated that the situation around the vehicle 10 is a situation in which the wiper 7 does not need to be operated. In this case, the period setting unit 32 may set the length of the determination period in accordance with the operation mode of the headlight 6 regardless of whether or not the wiper 7 is operating. For example, when the measured rainfall is less than the lower limit threshold, the period setting unit 32 may set the length of the determination period according to the operation mode of the headlight 6 by referring to the column corresponding to the time when the wiper 7 operates at a relatively high speed in the table 400, regardless of the operation mode of the wiper 7.

Similarly, the illuminance measured by an illuminance sensor (not shown) mounted on the vehicle 10 may indicate that the surroundings of the vehicle 10 are bright enough that the headlight 6 does not need to be turned on. In this case, the period setting unit 32 may set the length of the determination period in accordance with the operation mode of the wiper 7 regardless of whether or not the headlight 6 is turned on. For example, in a case where the measured illuminance is equal to or higher than the threshold value for turning off the headlight 6, the period setting unit 32 refers to a row corresponding to the case where the headlight 6 is turned on and the lighting direction is high in the table 400 regardless of the operation mode of the headlight 6. Then, the period setting unit 32 may set the length of the determination period according to the operation mode of the wiper 7 by referring to the row.

The period setting unit 32 sets the length of the determination period in accordance with the above processing every time the ignition switch of the vehicle 10 is turned on or the operation mode of the headlight 6 or the operation mode of the wiper 7 is changed. Then, the period setting unit 32 notifies the determination unit 31 of the length of the set determination period.

When receiving the determination result that the field of view of the camera 2 is in the poor visibility state from the determination unit 31, the notification processing unit 33 notifies the driver of the fact that the field of view of the camera 2 is in the poor visibility state (hereinafter, may be simply referred to as a “poor visibility”) via the notification device 4. Alternatively, when receiving the determination result that the field of view of the camera 2 is in the poor visibility state, the notification processing unit 33 may notify that the autonomous driving control or the driving assist cannot be continued (hereinafter, may be simply referred to as “impossible to continue driving control”) via the notification device 4. That is, when the notification device 4 includes the display device, the notification processing unit 33 causes the display device of the notification device 4 to display a message or an icon indicating that the field of view is poor visibility, or the driving control cannot be continued. In addition, when the notification device 4 includes a speaker, the notification processing unit 33 causes the speaker of the notification device 4 to output an audio signal indicating that the field of view is poor visibility, or the driving control cannot be continued.

Further, when receiving the determination result that the field of view of the camera 2 is not in the poor visibility state from the determination unit 31 after the notification of poor visibility or the notification of impossible to continue driving control, the notification processing unit 33 stops the notification of poor visibility or the notification of impossible to continue driving control via the notification device 4.

The vehicle control unit 34 controls the autonomous driving of the vehicle 10 or supports the driving of the driver in accordance with the driving control mode being applied to the vehicle 10 until the determination result that the field of view of the camera 2 is in the poor visibility state is received from the determination unit 31. To this end, the vehicle control unit 34 inputs the image received from the camera 2 to a classifier to detect an object (for example, another vehicle that travels around the vehicle 10, a road marking such as a lane division line, or a pedestrian) that may affect the traveling of the vehicle 10. The classifier is constituted by, for example, a so-called deep neural network (DNN) having a convolutional neural network-type architecture or attention mechanisms. Alternatively, the classifier may be a classifier based on a machine learning system other than DNN, such as an AdaBoost classifier or a support vector machine. Such a classifier is trained in advance according to a predetermined learning method such as an error back propagation method using a large number of teacher images representing an object to be detected.

The vehicle control unit 34 executes autonomous driving control so that the vehicle 10 continues traveling along the host lane while traveling on the basis of the detected lane division lines. At this time, the vehicle control unit 34 controls the steering of the vehicle 10 so that the vehicle 10 travels at the center of the two lane dividing lines closest to the vehicle 10. Alternatively, in the case of assisting driving of the driver, when the distance between any lane division line and the vehicle 10 becomes equal to or less than a predetermined threshold value, the vehicle control unit 34 controls the steering of the vehicle 10 so as to be separated from the lane division line, or warns the driver of the deviation of the vehicle 10 from the host lane via the notification device 4. Since the parameters of the camera 2 such as the mounted position, the shooting direction, and the angle of view are known, the vehicle control unit 34 can estimate the distance between the vehicle 10 and the lane division line on the basis of the position of the lowermost end side of the lane division line on the image.

Further, the vehicle control unit 34 controls the accelerator or the brake so that the speed of the vehicle 10 approaches the set target speed. Further, when another vehicle traveling ahead of the vehicle 10 is detected and the distance between the other vehicle and the vehicle 10 is less than the predetermined distance threshold, the vehicle control unit 34 controls the accelerator or the brake to decelerate the vehicle 10 so that the distance becomes equal to or larger than the distance threshold. Since it is assumed that the position of the lower end of the region where the other vehicle is represented on the image indicates the position where the other vehicle is in contact with the road surface, the vehicle control unit 34 can estimate the distance between the vehicle 10 and the other vehicle based on the position of the lower end of the region on the image and parameters of the camera 2 such as the mounted position, the shooting direction, and the angle of view. In addition, when a range sensor such as a LiDAR or a radar is provided with the vehicle 10, the vehicle control unit 34 may estimate the distance measured by the range sensor for the azimuth corresponding to the area where the other vehicle is represented on the images as the distance between the vehicle 10 and the other vehicle.

Further, when the determination result that the field of view of the camera 2 is in the poor visibility state is received from the determination unit 31, the vehicle control unit 34 stops the autonomous driving control and the driving assist after a predetermined period has elapsed since the notification of the determination result, and sets the control of the vehicle 10 as the manual driving control by the driver. Note that, even after a predetermined period of time has elapsed since the determination result that the field of view of the camera 2 is in the poor visibility state has been notified, if a signal indicating that the driver has gripped the steering is not received from a touch sensor (not shown) provided in the steering, the vehicle control unit 34 may cause the vehicle 10 to stop in an emergency.

Figure 5:
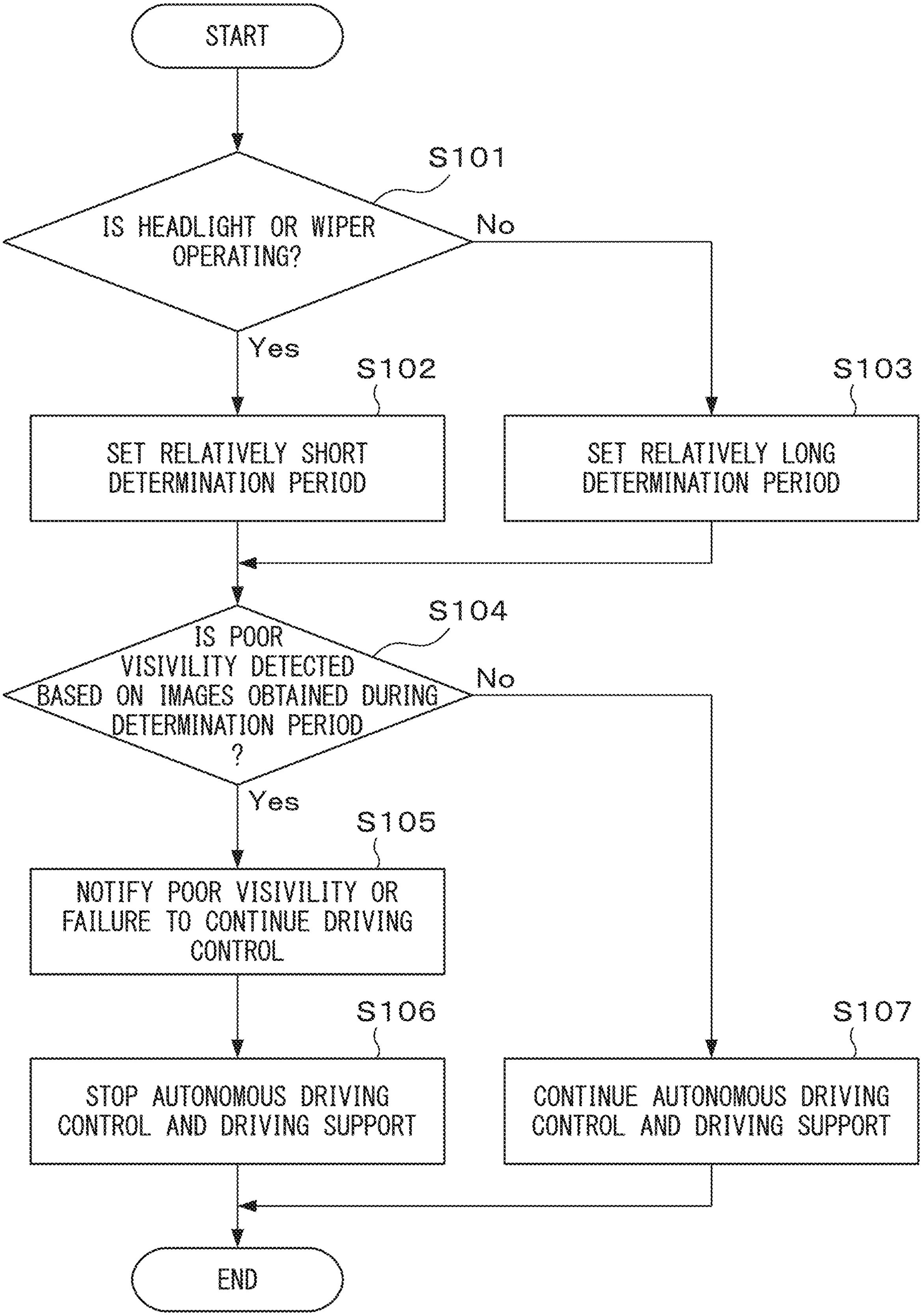
FIG. 5 is an operation flowchart of the vehicle control process including the poor visibility determination process.

FIG. 5 is an operation flowchart of the vehicle control process including the poor visibility determination process executed by the processor 23.

The period setting unit 32 refers to the operation mode being applied to the headlight 6 and the wiper 7, and determines whether or not at least one of the headlight 6 and the wiper 7 is operating (step S101). When the headlight 6 is on or the wiper 7 is operating (step S101—Yes), the period setting unit 32 sets a relatively short determination period according to the operation mode of the headlight 6 and the operation mode of the wiper 7 (step S102). On the other hand, when the headlight 6 is off and the wiper 7 is stopped (step S101—No), the period setting unit 32 sets a relatively long determined period (step S103).

After the step S102 or S103, the determination unit 31 determines whether or not the field of view of the camera 2 is in a poor visibility state based on the plurality of images generated by the camera 2 during the determination period (step S104). When the visual field of the camera 2 is in the poor visibility state (step S104—Yes), the notification processor 33 notifies the driver of poor visibility or impossible to continue the driving control via the notification device 4 (step S105). Further, the vehicle control unit 34 stops the autonomous driving control of the vehicle 10 and the driving assist for the driver (step S106). On the other hand, when the field of view of the camera 2 is not in the poor visibility state (step S104—No), the vehicle control unit 34 continues the autonomous driving control of the vehicle 10 or the driving assist for the driver (step S107). After S106 of steps or S107, the processor 23 terminates the vehicle-control process.

As described above, the poor visibility determination device adjusts the length of the determination period used for determining whether a field of view of a camera mounted on a vehicle is in a poor visibility state in accordance with the operation status of the at least one visibility ensuring device for ensuring visibility of the visual field of the camera. Therefore, the poor visibility determination device can shorten the period required for determining whether or not the field of view of the camera is in the poor visibility state.

Note that the visibility ensuring device is not limited to a headlight and a wiper. For example, the visibility ensuring device may be an air conditioner or a defogger. The period setting unit 32 may set the length of the determination period in the case where the air conditioner is performing the defogging operation shorter than that of the determination period in the case where the defogging operation is not performed. In addition, the period setting unit 32 may set the length of the determination period when the defogger is operating shorter than that of the determination period when the defogger is not operating. In particular, in some embodiments, in the case where the camera to be determined for poor visibility is a camera that is mounted in the vehicle interior and captures an image of the rear area of the vehicle 10, the determination period is set in accordance with the operation mode of the air conditioner or the operation mode of the defogger provided in the rear window rather than the operation mode of the headlight 6.

Further, the computer program for realizing the functions of the processor 23 of the ECU 5 according to the above-described embodiment or modification may be provided in a form recorded in a computer-readable portable recording medium such as a semiconductor memory, a magnetic recording medium, or an optical recording medium.

As described above, a skilled person can make various modifications according to the embodiment within the scope of the present disclosure.

What is claimed is:

1. A poor visibility determination device comprising:

a processor configured to:

generate a plurality of images within a predetermined period by a camera mounted on a vehicle;

determine, for each image of the plurality of images, an edge strength of each pixel by executing an edge detection filter process;

calculate, for each image, a statistical representative value of the edge strength calculated for each pixel;

determine whether or not a field of view in an imaging area of the camera is in a poor visibility state when a state in which the statistical representative value of the edge strength is equal to or less than a fogging determination threshold value continues over a predetermined determination period; and set the determination period so that a length of the determination period when at least one visibility ensuring device for ensuring visibility of a field of view of the camera is operating is shorter than the length of the determination period when the visibility ensuring device is not operating.

2. The poor visibility determination device according to claim 1, wherein the visibility ensuring device includes a wiper, and the processor shortens the length of the determination period as an operation period of the wiper is shorter.

3. The poor visibility determination device according to claim 1, wherein the visibility ensuring device includes a headlight, and the processor sets the determination period so that the length of the determination period when the headlight is turned on and a lighting direction of the headlight is high is shorter than the length of the determination period when the lighting direction is low.

4. The poor visibility determination device according to claim 1, wherein the visibility ensuring device includes a wiper and a headlight, and the processor sets the determination period so that the length of the determination period when the headlight is turned on and the wiper is operating is shorter than the length of the determination period when the headlight is turned off or the wiper is not operating.

5. The poor visibility determination device according to claim 1, wherein the visibility ensuring device includes a headlight, and when the headlight is turned on, the processor determines whether or not the field of view in the imaging area of the camera is in the poor visibility state based on a value of each pixel included in an area corresponding to an illumination range of the headlight in each of the plurality of images generated within the determination period.

* * * * *